(12) United States Patent
Calder et al.

(10) Patent No.: US 8,762,336 B2
(45) Date of Patent: Jun. 24, 2014

(54) GEO-VERIFICATION AND REPAIR

(75) Inventors: Bradley Gene Calder, Bellvue, WA (US); Niranjan Nilakantan, Redmond, WA (US); Shashwat Srivastav, Seattle, WA (US); Jiesheng Wu, Redmond, WA (US); Abdul Rafay Abbasi, Redmond, WA (US); Shane Mainali, Duvall, WA (US); Padmanabha Chakravarthy Uddaraju, Bellvue, WA (US)

(73) Assignee: Microsoft Corporation, Redmond, WA (US)

( * ) Notice: Subject to any disclaimer, the term of this patent is extended or adjusted under 35 U.S.C. 154(b) by 482 days.

(21) Appl. No.: 13/113,634

(22) Filed: May 23, 2011

(65) Prior Publication Data

US 2012/0303593 A1 Nov. 29, 2012

(51) Int. Cl.
*G06F 7/00* (2006.01)
*G06F 17/00* (2006.01)

(52) U.S. Cl.
USPC ........................................................ 707/638

(58) Field of Classification Search
USPC ........................................................ 707/638
See application file for complete search history.

(56) References Cited

U.S. PATENT DOCUMENTS

| | | |
|---|---|---|
| 7,509,530 B2 | 3/2009 | Welts |
| 7,580,959 B2 | 8/2009 | Boyd et al. |
| 7,861,111 B2 | 12/2010 | Doerr |
| 2005/0193035 A1 | 9/2005 | Byrne |
| 2007/0043969 A1 | 2/2007 | Schneider |
| 2007/0276823 A1 | 11/2007 | Borden et al. |
| 2011/0106763 A1* | 5/2011 | Madan et al. ............. 707/639 |
| 2012/0233418 A1* | 9/2012 | Barton et al. ............. 711/162 |

OTHER PUBLICATIONS

U.S. Appl. No. 13/113,718, applicant Bradley Gene Calder, titled "Replication Processes in a Distributed Storage Enviornment", filed May 23, 2011, 55 pages.
U.S. Appl. No. 13/113,702, applicant Bradley Gene Calder, titled "Synchronous Replication in a Distributed Storage Enviornment", filed May 23, 2011, 62 pages.
U.S. Appl. No. 13/113,795, applicant Bradley Gene Calder, titled "Implementing Failover Processes Between Storage Stamps", filed May 23, 2011, 80 pages.
U.S. Appl. No. 13/113,729, applicant Bradley Gene Calder, titled "Versioned and Hierarchical Data Structures and Distributed Transactions", filed May 23, 2011, 25 pages.

(Continued)

*Primary Examiner* — Alexey Shmatov
(74) *Attorney, Agent, or Firm* — Ben Tabor; David Andrews; Micky Minhas

(57) ABSTRACT

Presented herein are methods of continuously verifying data and repairing errors introduced during replication. In a particular embodiment, a primary data store sends out information sufficient to create a checkpoint together with a checksum for the data being verified at that checkpoint. At the secondary data store, a checkpoint is created in accordance with the checkpointing information, and a checksum is calculated over the indicated data at the created checkpoint. If the calculated checksum disagrees with the received checksum, additional checksums are calculated over subranges of the indicated data and compared with corresponding checksums over the data at the primary data store. The checksums at the primary data store may be requested from the primary data store or calculated locally based on the received overall checksum. Once an erroneous entry is identified, it can then be re-replicated from the primary data store to restore data consistency.

15 Claims, 10 Drawing Sheets

(56) References Cited

OTHER PUBLICATIONS

U.S. Appl. No. 13/113,808, applicant Bradley Gene Calder, titled "Storage Account Migration Between Storage Stamps", filed May 23, 2011, 68 pages.
U.S. Appl. No. 13/113,776, applicant Bradley Gene Calder, titled "Load Balancing When Replicating Account Data", filed May 23, 2011, 58 pages.
U.S. Appl. No. 13/113,688, applicant Bradley Gene Calder, titled "Asynchronous Replication in a Distributed Storage Environment", filed May 23, 2011, 52 pages.
Smith, David P., "High Availability and Disaster Recovery at ServiceU: A SQL Server 2008 Technical Case Study", Retrieved on: Dec. 30, 2010 Available at: http://msdn.microsoft.com/en-us/library/ee355221%28SQL.100%29.aspx.
Rosique, Michelle, "How to recover from a disaster on a multi-partitioned IBM eServer iSeries system using IBM TotalStorage Metro Mirror", Published on: Nov. 2005 Available at: http://www-03.ibm.com/systems/resources/systems_services_downloads_G565-1450-01.pdf.

* cited by examiner

GEO-VERIFICATION AND REPAIR

INTRODUCTION

It is desirable for many reasons to replicate stored data between a number of data stores. This provides redundancy in the event of disaster or failure of a primary data store. However, care must be taken to ensure that this replicated data is in agreement with the data stored at the primary data store, or it may be useless in the event that it is needed. However, due to the continuously changing data being stored at the data stores, conventional methods of comparing replicas of the data are not possible. Similarly, repairing errors by re-replicating the entire data store represents an enormous investment of time and resources, during which one or both data stores may be unavailable. Accordingly, methods of continuously verifying data and repairing errors introduced during replication are presented herein.

SUMMARY

Embodiments of the present invention relate to systems, methods and computer storage media for ensuring consistency across replicated data in a replicated data storage system. This is done by creating checkpoints for the system, and comparing checksums of the data to be verified at those checkpoints. Additionally provided are methods for localizing and repairing errors once they have been detected. In various embodiments, data to be verified is grouped by range or chronologically. To this end, various subsidiary methods are also presented.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWING

Illustrative embodiments of the present invention are described in detail below with reference to the attached drawing figures, and wherein.

DETAILED DESCRIPTION

Figure 1:
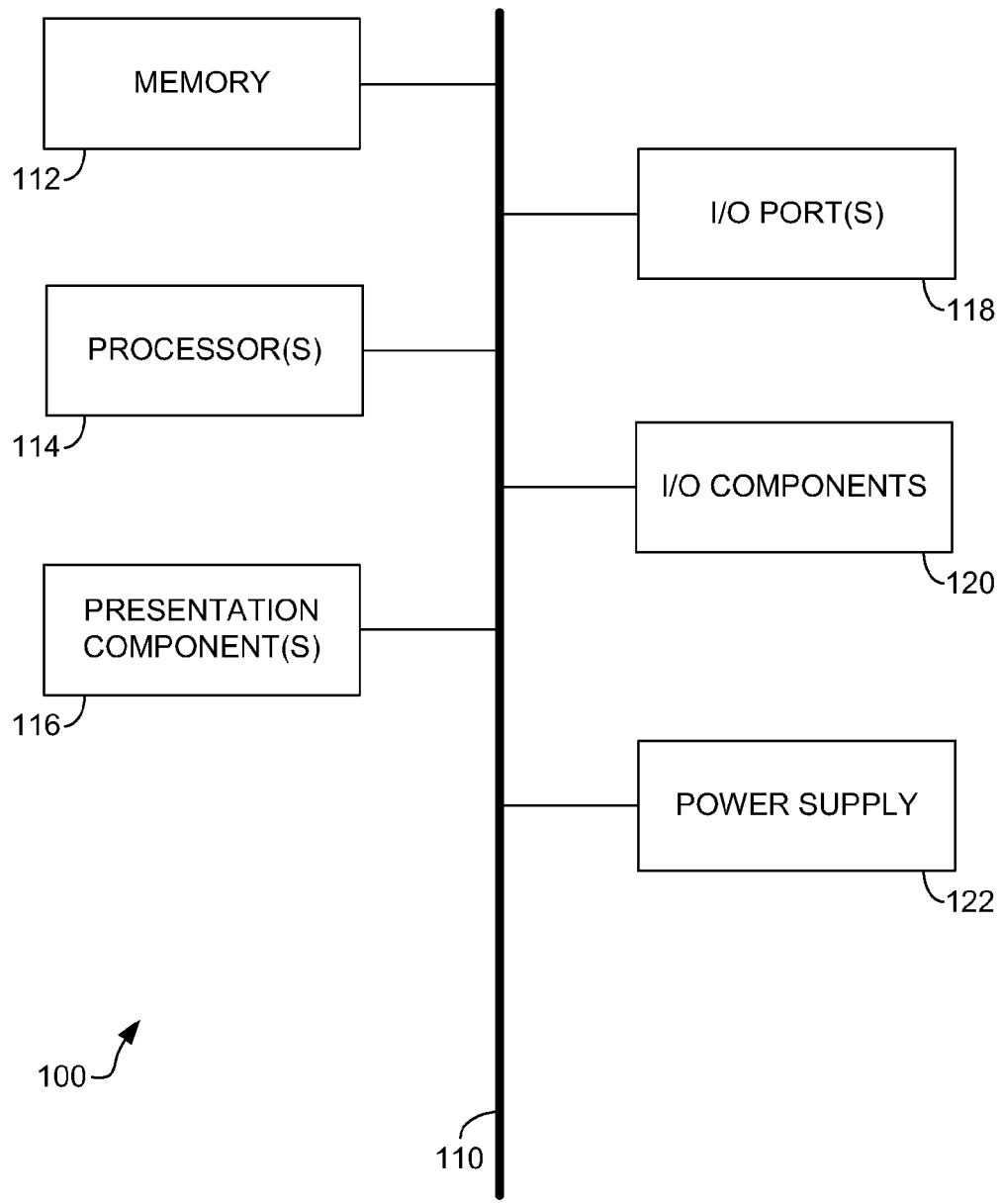
FIG. 1 depicts an exemplary computing device suitable for implementing embodiments of the present invention.

The subject matter of the present invention is described with specificity to meet statutory requirements. However, the description itself is not intended to define the scope of the claims. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described. Further, the present invention is described in detail below with reference to the attached drawing figures, which are incorporated in their entirety by reference herein.

Embodiments of the present invention relate to systems, methods and computer storage media for validating the consistency of replicated data, and for repairing errors found by that validation.

Accordingly, in one aspect, the present invention one or more computer storage media having computer-executable instructions embodied thereon that, when executed, cause a computing device to perform a method of ensuring consistency across a replicated data storage system. The method comprises receiving, at a secondary data store, one or messages from a primary data store, the one or more messages comprising checkpointing information and a checksums for one or more ranges of data in a corresponding checkpoint at the primary data store. The method further comprises creating a local checkpoint in accordance with the checkpointing information, calculating local checksums over the ranges of data in the local checkpoint, and comparing the local checksums with the received checksums to determine if a discrepancy exists for the range of data between data stored at the primary data store and data stored at the secondary data store.

In another aspect, the present invention one or more computer storage media having computer-executable instructions embodied thereon that, when executed, cause a computing device to perform a method of ensuring consistency across a replicated data storage system. The method comprises receiving, at a secondary data store, one or more messages from a primary data store that comprises an identifier for a previous checkpoint, current checkpointing information, and checksums over the incremental checkpoint. The method further comprises obtaining an incremental difference set between a previous local checkpoint and the current local checkpoint. The method also comprises calculating a local incremental difference checksum over the incremental difference set and comparing the local incremental difference checksum to the received incremental difference checksum to determine if a discrepancy has been introduced between data stored at the primary data store and data stored at the secondary data store.

A third aspect of the present invention provides for a system for maintaining a consistent replicated data store. The system comprises a primary data store configured to send a checksum message to a secondary data store, which comprises checkpointing information and checksum information for at least a portion of the data associated with a checkpoint creatable from the checkpointing information. The primary data store is also configured to respond with a checksum reply comprising a checksum over a subrange of data in response to receiving a checksum request from a secondary data store that identifies a subrange of data and send a re-replication reply to the secondary data store comprising a data entry to the secondary data store in response to receiving a re-replication request from the secondary data store that identifies a data entry. The system also comprises a secondary data store configured to, in response to receiving a checksum message from the primary data store, extract the checkpointing information and the checksum information, create a checkpoint based on the checkpointing information, calculate a checksum based on the checkpoint, and compare the checksum to the checksum information. If the secondary detects a discrepancy by comparing the checksum it calculated against the checksum sent by the primary, it will respond to the primary indicating which checkpoint and range had an error. The primary data store upon receiving an error, is configured to determine the exact elements that are different by taking the original checksum range and breaking it up into smaller ranges and then sending those over to the secondary to check. The subrange is reduced in this manner until the method identifies the exact range of entries that are different.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. Computing device 100 is but one example of a suitable computing environment and is not intended to suggest any limitation as to the scope of use or functionality of the invention. Neither should the computing environment 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation modules 116, input/output (I/O) ports 118, I/O modules 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O module. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise the following exemplary non-transitory media: Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O modules 120. Presentation module(s) 116 present data indications to a user or other device. Exemplary presentation modules include a display device, speaker, printing module, vibrating module, and the like. I/O ports 118 allow computing device 100 to be logically coupled to other devices including I/O modules 120, some of which may be built in. Illustrative modules include a microphone, joystick, game pad, satellite dish, scanner, printer, wireless device, and the like.

Figure 2A:
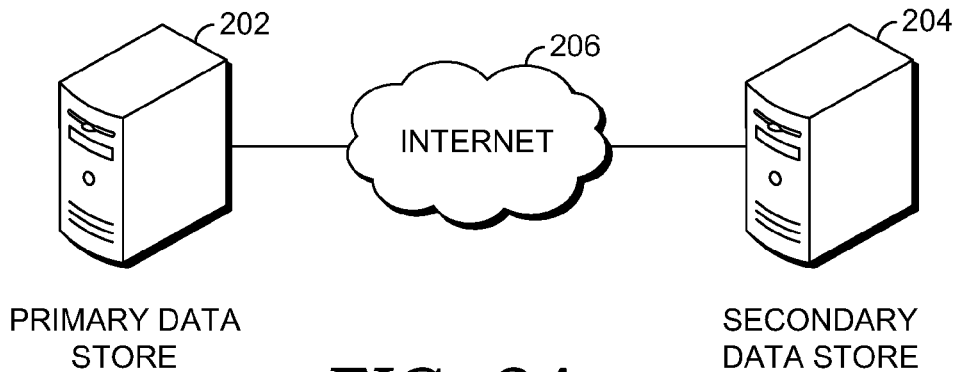
FIG. 2A depicts a simple environment suitable for implementing embodiments of the present invention.

Turning now to FIG. 2A, a simple environment suitable for practicing a method of verifying replicated data is depicted. A primary data store 202 maintains an authoritative version of the data to be replicated. Secondary data store 204 maintains a replicated copy of the data stored at primary data store 202. Each data store component shown in FIG. 2 may be any type of computing device, such as computing device 100 described with reference to FIG. 1, for example. Primary data store 202 and secondary data store 204 communicate in the illustrated embodiments via Internet 206. In other embodiments, primary data store 202 and secondary data store 204 communicate via a local area network, or are co-located on the same computer and communicate via inter-process communication.

Figure 2B:
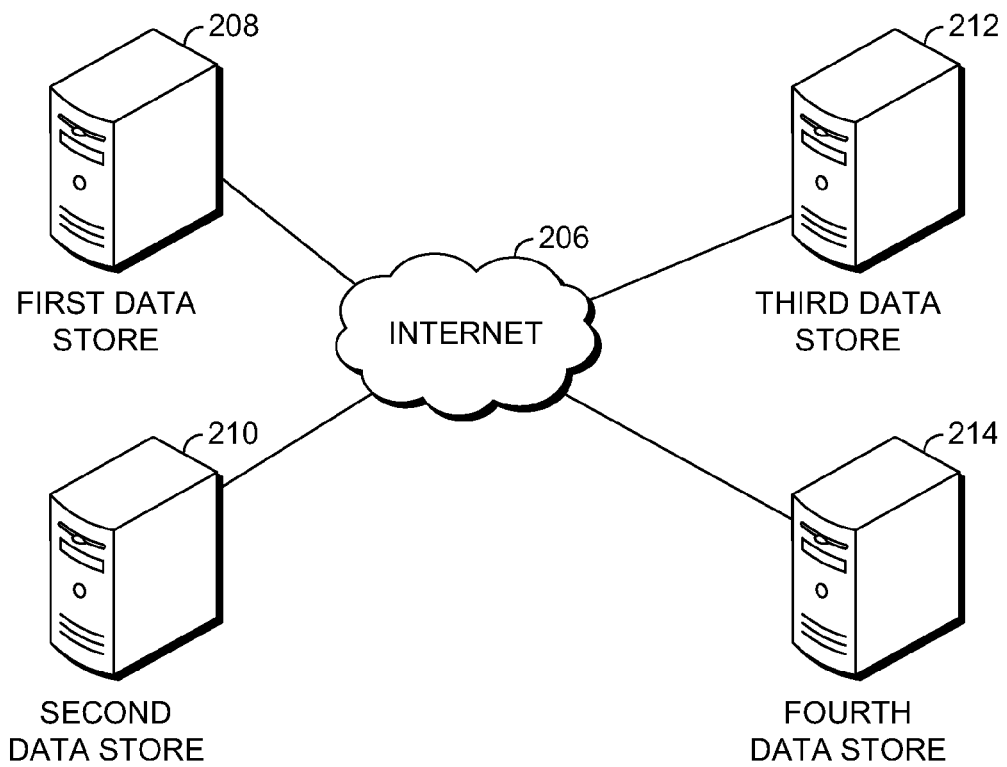
FIG. 2B depicts a more complex environment suitable for implementing embodiments of the present invention.

Turning now to FIG. 2B, a more complex environment suitable for practicing a method of verifying replicated data is depicted. Four data stores, a first data store 208, a second data store 210, a third data store 212 and a fourth data store 214 are depicted. In the environment as shown, no data store is explicitly a primary data store or secondary data store, per se, but rather each data store acts as a primary data store or secondary data store with respect to certain data. As an illustrative example, with regards to certain data, the first data store 208 acts as a primary data store, while the second data store 210 acts as a secondary data store and the third and fourth data stores 212 and 214 do not store the data at all. In an alternative example, fourth data store 214 acts as a primary data store, while both second and third data stores 210 and 212 act as secondary data stores. Note that a data store may act as a primary data store for a first set of data, a secondary data store for a second set of data, and not store a third set of data at all. As in FIG. 2A, the data stores are depicted as communicating via Internet 206, though other methods of communication are envisioned.

It should be noted that, although the environment in which many embodiments will be practiced will more closely resemble FIG. 2B than FIG. 2A, those embodiments will be discussed herein in the context of FIG. 2A for the purposes of simplicity. It will be apparent to one skilled in the art how such discussion can be applied in the context of more complex environments such as FIG. 2B.

Figure 3:
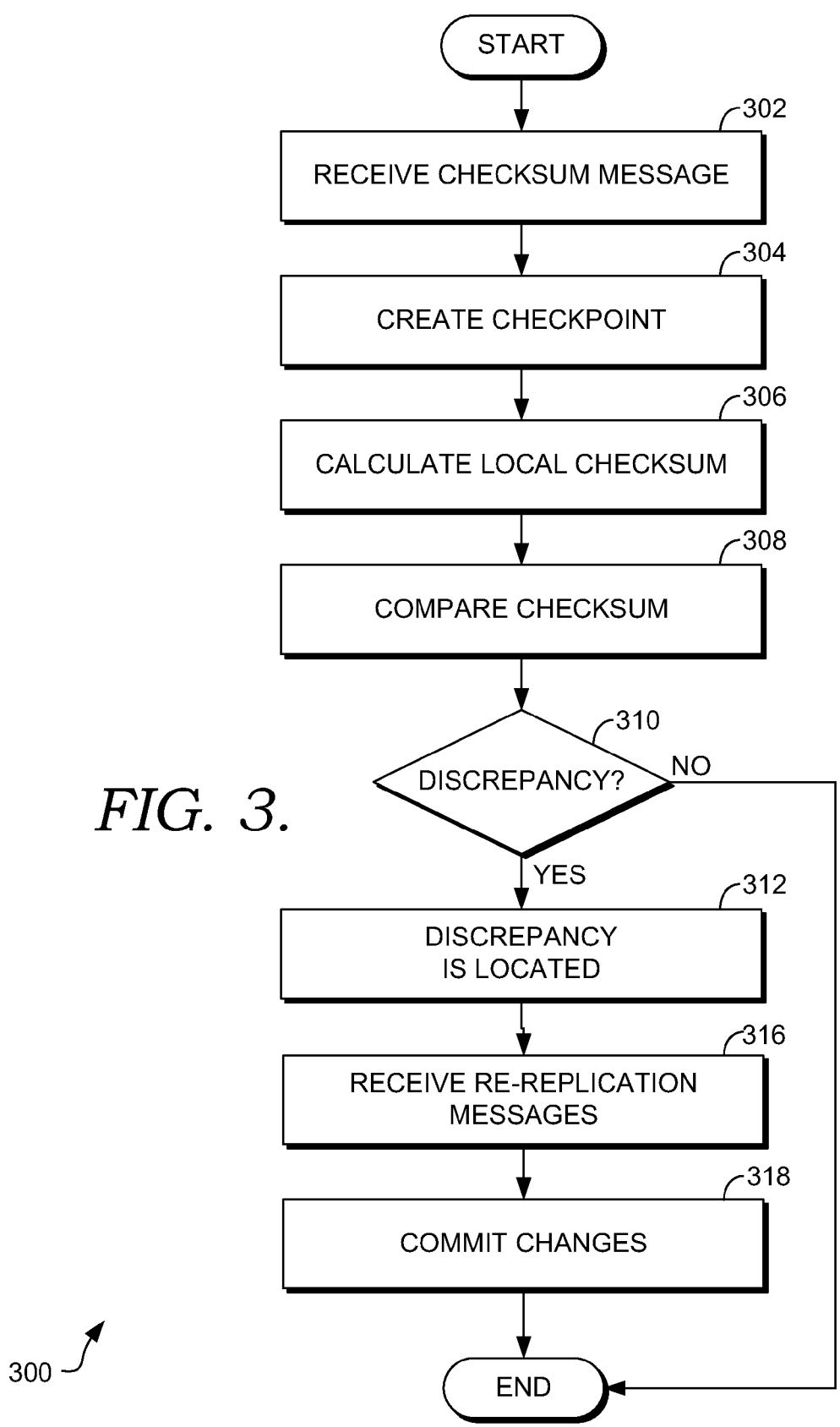
FIG. 3 depicts a flowchart diagram in accordance with an embodiment of the present invention.

Turning now to FIG. 3, an exemplary data flow diagram 300 in accordance with one embodiment of the present invention is presented. Initially, at step 302, a secondary data store such as secondary data store 204, receives one or more checkpoint and checksum messages from a primary data store such as primary data store 202. The primary data store may send out such messages periodically, after a predetermined number of transactions have been processed since the last checksum message, or in response to user or administrator request. The checkpoint and checksum messages comprise information sufficient for the secondary data store to create a checkpoint that corresponds to the primary data store's checkpoint and a checksum for some or all of the data at the time of that checkpoint. It may also contain information regarding a certain subset of data over which the checksum is calculated. Although the term "one or more checkpoint and checksum messages" is used here, it will be apparent to one skilled in the art that a single message can be sent containing both checkpointing and checksum information, one or more messages can be sent separately for the checkpointing information and checksum information, or multiple messages can be sent, each of which contains both checkpointing and checksum information.

It should be understood here that data is replicated between the primary data store and the secondary data store in a series of transactions, each transaction containing an update for one or more data entries. An update for an entry here can be the creation, modification, or deletion of the entry. Because a secondary data store may be processing transactions for a variety of sources over a variety of communications paths, transactions from the primary data store may not be received or processed in order. Accordingly, a checksum across a notional "current state" of the system may not be meaningful. Accordingly, checkpoints are created whenever checksums are required. A checkpoint is a state of the system when the set of transactions that have been processed is precisely specified. For example, if transactions are numbered sequentially, a checkpoint may be created by processing all those transactions, and only those transactions, with a sequence number less than or equal to a specified transaction number. Thus, at corresponding checkpoints, data stored at the primary data store and data stored at the secondary data store will be substantially identical if the data have been replicated correctly.

It will be immediately recognized by one skilled in the art that directly comparing or transferring all of the data as it exists at the checkpoint is unwieldy and impractical. Instead, a checksum is transmitted. Broadly speaking, a checksum is a function calculated over a quantity of data that should change if the underlying quantity of data has changed. For example, simple checksums include such algorithms as a cyclic redundancy check, MD5 hash, and the SHA-1 hash. Other, more complicated checksums can indicate where two nearly identical quantities of data differ. Thus, the checksum message contains the information needed to determine if the data stored at the primary data store and the secondary data store are in agreement at a specified state of the system.

After receiving the checkpoint and checksum messages, the secondary data creates a checkpoint in accordance with the checkpointing information contained in the checkpoint and checksum message at a step 304. Creating this checkpoint will generally involve ensuring that exactly a specified set of transactions have been committed, but the mechanics of doing so will depend on the precise embodiment of checkpointing employed. Next, at a step 306, a checksum is calculated over some or all of the data in the system as it exists at the checkpoint. If the checksum is to be calculated over only a portion of the data, information sufficient to identify that portion will also be included in the checksum message.

Once the local checksum has been calculated, it is compared at a step 308 to the checksum received as part of the checksum message. If the two checksums agree, this is a strong indication that the data as stored at the primary data store and the data as stored at the secondary data store also agree and the algorithm terminates in this example. If, however, the checksums disagree, this indicates at a step 310 that a discrepancy exists between the data as stored at the different data stores.

At step 312, the data entry which differs between the primary data store and the secondary data store is located. Various embodiments make this determination in different ways. For two illustrative examples, see FIGS. 4A and 4B. Additionally, in some embodiments, this determination will be made by the primary data store in certain embodiments, while it will be made at the secondary data store in other embodiments.

Once a differing entry has been located, the primary data store re-replicates the differing data. Depending on the nature of the differing entry, this could be a request for the single differing entry, or a request for a number of entries that depend in some fashion on the differing entry. If the determination is the differing data is made at the secondary data store, the secondary data store may send one or more messages to the primary data store requesting the re-replication of the differing data. At a step 316, the secondary data store receives one or more re-replication messages from the primary data store containing the re-replicated entries, and at a step 318, the secondary data store commits the changes in the reply, replacing the differing entry.

In some embodiments, another checksum is calculated over the entire range of data in the original checksum message to confirm that no other discrepancies are present. In other embodiments, the checksums are recalculated for each subrange that was previous determined to contain a discrepancy (see FIGS. 4A and 4B). In yet other embodiments, the algorithm terminates once a single discrepancy has been found.

Figure 4A:
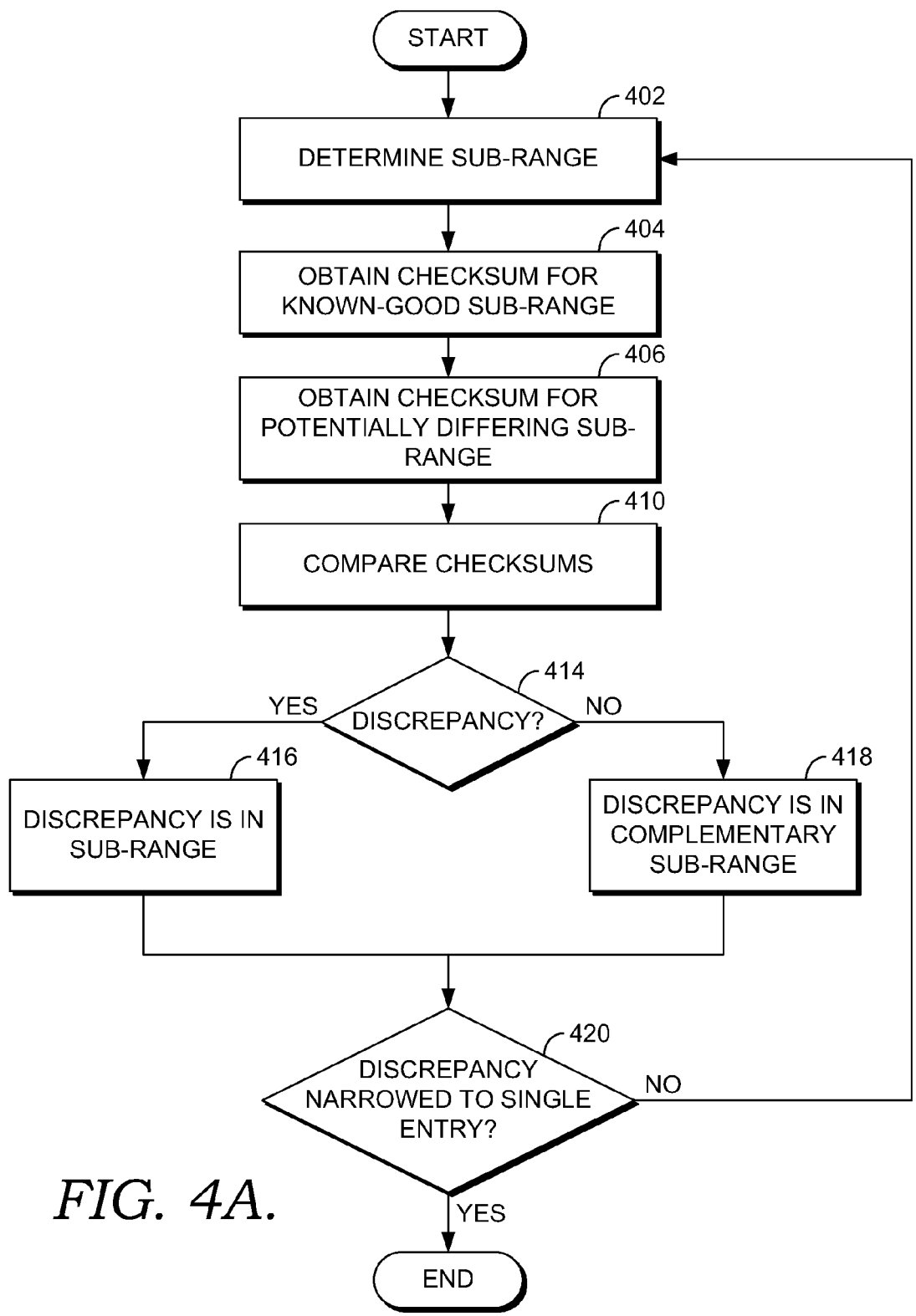
FIGS. 4A and 4B provide flowcharts for methods of locating an erroneous in accordance with various embodiments of the present invention.

Turning now to FIG. 4A, an algorithm for identifying an erroneous entry in a range of entries is presented in accordance with certain embodiments of the present invention. This algorithm could be employed, for example, at step 312 of FIG. 3. In one embodiment, this algorithm is employed at the primary data store, and the checksums for the potentially differing subranges are obtained by sending a request to the secondary data store. In another embodiment, the algorithm is performed at the secondary data store, and the checksums for the known-good subrange are obtained by sending a request to the primary data store. Initially, at a step a 402, a subrange of data is selected from within the range of data where the discrepancy is known to lie. For an example of how to determine this subrange, see FIG. 5 and the accompanying discussion. When a discrepancy is found at the secondary, it responds to the primary what the range of the discrepancy was for one of the checksums that had been sent and a subrange is determined at a step 402. Once the subrange has been determined, a checksum for the known-good data in the subrange is obtained at a step 404. At a step a 406, a checksum for the potentially differing data in the subrange is obtained. It will be clear to one skilled in the art that steps 404 and 406 can be carried out in any sequential order or in parallel. At a step 412, the checksum computed over the known-good data in the subrange is compared to the checksum computer over the potentially differing data in the subrange.

At a step 414, it is determined whether there is a discrepancy between the two checksums. If there is such a discrepancy, the determination is made that the erroneous entry lies within the subrange at a step 416. If the two checksums agree, the determination is made that no erroneous entry lies in the subrange and that the erroneous entry must therefore lie in another subrange; that is, a portion of the initial range that does not lie within the subrange evaluated. In some embodiments, if there is a discrepancy in an initial range, all subranges are examined in order to check the complete range for discrepancies, since more than one discrepancy may be present.

With a new range for the erroneous entry established, the size of the new range is examined. If the new range contains only a single entry, than that entry has been identified as erroneous. Otherwise, steps 402 through 420 repeat with the new range to further narrow the range in which the erroneous entry resides. In some embodiments, step 420 may not require that the range be narrowed to an single entry in order to terminate, but only that it be sufficiently small. For example, if more than one entry can be sent in a single re-replication message, then step 420 may only require that the total size of the range be such that it will fit within a single message. Each embodiment will contain a predetermined criterion for when the narrowing process can stop; examples of such criteria given above are only exemplary and more will be immediately obvious to one skilled in the art.

Figure 4B:
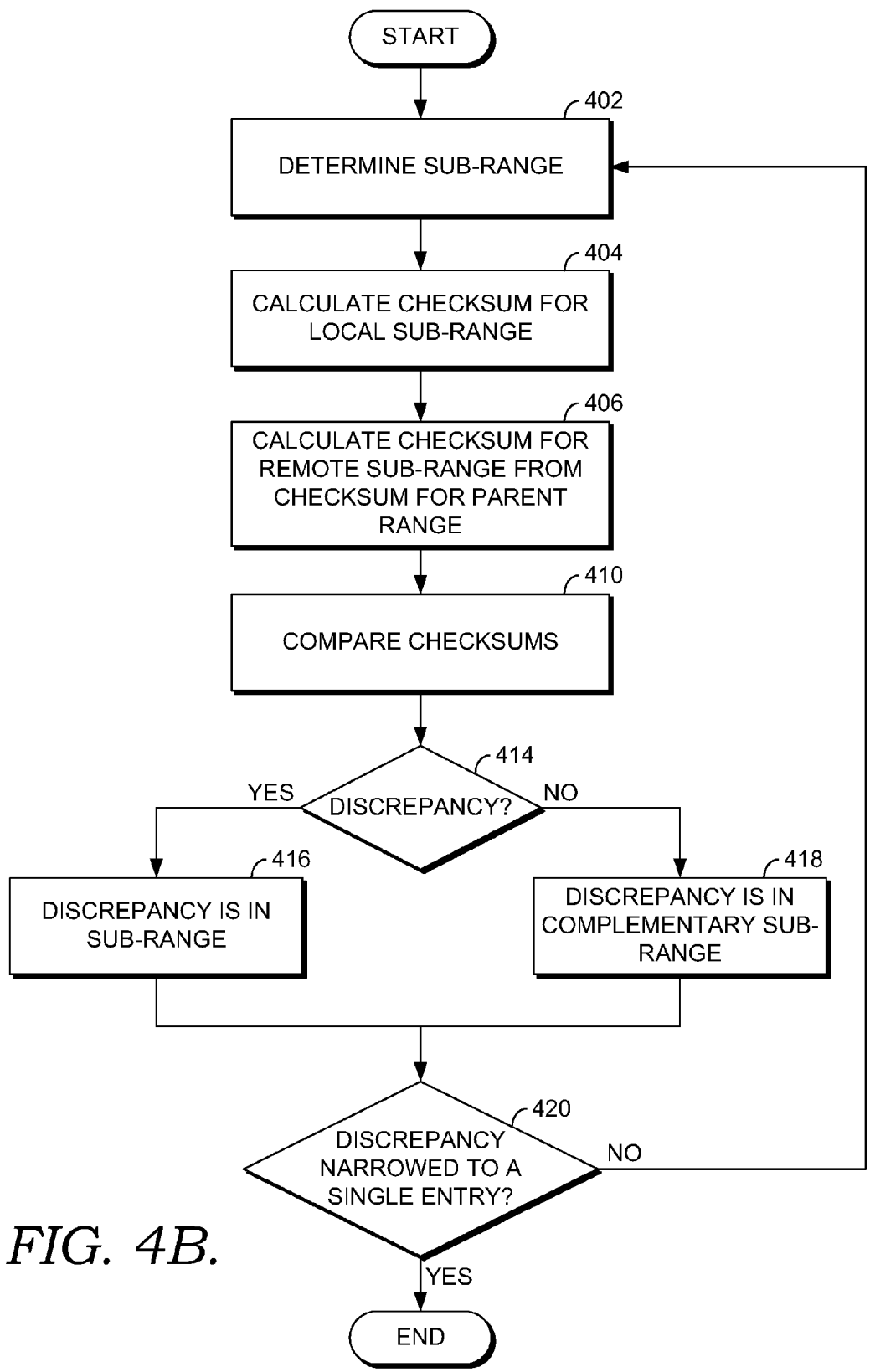

FIG. 4B presents an alternate embodiment of a method for locating an erroneous entry, suitable for use when hierarchical checksums are in use in accordance with certain other embodiments of the present invention. As above, this method can be carried out at the primary data store or at the secondary data store. When using a hierarchical checksum, given a range of data over which the checksum is taken, if one portion of the range is known to be correct, then the correct checksum for the remaining portion of the range can be computed. Most of the steps of FIG. 4B are the same as those in FIG. 4A; however, steps 406 and 408 have been steps of calculating a checksum over the locally stored data in the subrange and using the checksum for the remotely stored data in the range to calculate a checksum for the remotely stored data in the subrange. This has the advantage that multiple communication steps between the primary data store and the secondary data store are no longer required; however, the more complicated checksums may not be appropriate for every embodiment.

Figure 5:
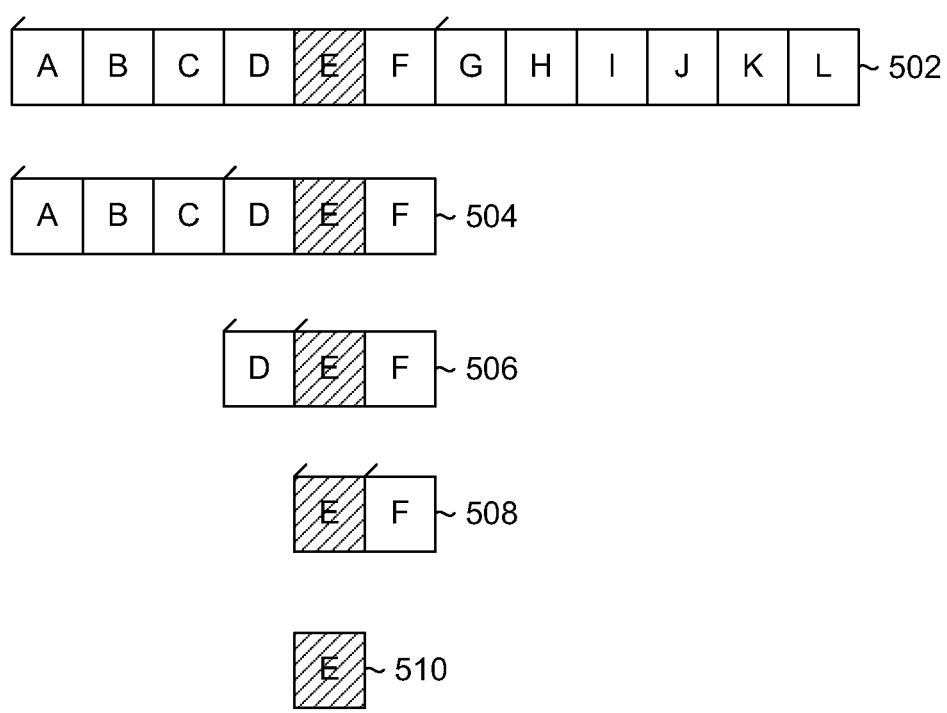
FIG. 5 provides an illustrative example of how subranges are chosen by methods such as those illustrated in FIGS. 4A and 4B.

FIG. 5 depicts an exemplary method for selecting subranges of data given a range within which an error is known to occur. A range of data is a compact representation of any collection of data entries. For example, in FIG. 5, data entries are represented alphabetically, and thus range 502 can be represented as "A-L" Similarly, if entries are represented numerically, a similar range could be given by "17-28." Nor do the identifiers of the entries need to be contiguous: the collection of dictionary entries beginning with the letter "A" could be given by "aardvark-azymous," even though "aqxz" lies within that range but is not a dictionary entry. A range could even be a simple list of the entries if there is not a more compact way to represent them. It will be apparent to one skilled in the art that ranges encompass many other methods of representing collections of entries.

The following references steps of FIGS. 4A and 4B in connection with the description of FIG. 5; any reference numerals beginning with "4" should be viewed with reference to those figures. Range 502 shows the range "A-L," which contains a single erroneous entry "E." In this embodiment, the subrange chosen is always the first half of the full range, with the size rounded down. Thus the first subrange chosen is "A-F." When subject to a discrepancy location algorithm such as algorithm 4A or 4B, it will be determined that the discrepancy lies within the chosen subrange. Thus, step 416 would be reached, and step 402 would be repeated for the range 504, "A-F." The new subrange chosen by this embodiment would thus be "A-C." This time, however, the locally computed and primary checksums for the range "A-C" would agree and it would thus be determined at step 418 that the discrepancy lies within the complement of the subrange; i.e. "A-F" less "A-C," or range 506, "D-F." Thus the algorithm would repeat again for that range. However, this time the range selected does not divide evenly in half; hence, the subrange selected would be only "D." Once again, the discrepancy does not lie within the selected subrange, so the error is narrowed to the complement of the subrange, range 508, "E-F." Again, only a single entry is chosen for the new subrange, "E." As "E" is erroneous entry, step 416 will determine that the error does lie within the chosen range. Finally, since the subrange has been narrowed to a single entry, step 420 will terminate the algorithm. It should be noted that, since multiple erroneous entries may be present, finding an erroneous entry in a subrange does not preclude the presence of an erroneous entry in the complementary subrange. In some embodiments, these complementary subranges are also checked for errors in parallel; in others, once a single error is located and corrected, the checking process can be restarted form the beginning.

Figure 6:
FIG. 6 provides an illustrative example of how partitioning across multiple secondary data stores can require recalculating checksums.
Figure 6:
Figure 6:
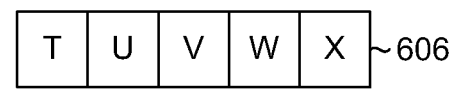
Figure 6:
Figure 6:
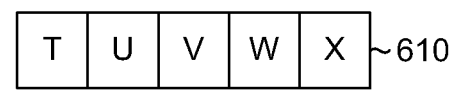

Turning now to FIG. 6, an illustrative example of how partitioning across multiple secondary data stores can require recalculating checksums is provided. The following discussion references previous figures in connection with the description of FIG. 5; any reference numerals beginning with should be viewed with reference to those figures corresponding to the leading digit of the reference numeral. As described above with reference to FIG. 2B, it may be the case that a single data store has multiple secondary data stores, each of which replicates only a portion of the data entries from the data store. It may also be the case, that each of those secondary data store also replicates a portion of the data entries which have a different primary data store. For example, first data store 208 is the primary data store for range "P-X," while the second data store 210 is the secondary data store for the range "M-S" and the third data store 212 is the secondary data store for the range "T-Z." Thus, if primary data store sends a checksum message for the range "P-X" to second data store 210 and third data store 212, neither may be able to verify the data using the provided checksum. Second data store 210, before calculating the checksum, will determine that it does not have the full range of the checksum for P-X because it is not the secondary data store for "T-X," and third data store 212 will similarly encounter determine that it is not the secondary data store for "P-S." To resolve these discrepancies, second data store 210 can send a message containing the range that it does serve ("M-S") back to the primary data store, and the primary data store will then identify the overlapping range 608 ("P-S") and send that to the second data store, which will now be able to perform the correct checksum for that range. Similarly, third data store 212 can send a message identifying the range 606 that it stores ("T-X") back to the primary. The primary will then calculate a checksum for just subrange 610 ("T-X") and send it back to third data store 212 to perform the correct checksum comparison. If no discrepancies are found in these narrowed ranges, no action need be taken; otherwise, events proceed as described above with reference to FIG. 3 (or another exemplary embodiment). It will be apparent to one skilled in the art that certain other replication strategies can require altering checksum ranges to avoid the specious detection of discrepancies. For example, the primary data store and the secondary data store may have certain data that is not replicated, either because it is specific to the data store or because only a single copy of the data is needed. These cases are handles similarly to the one described above: the data shared between the specific primary data store and the specific secondary data store involved is determined, and checksums are calculated only over this data.

Figure 7A:
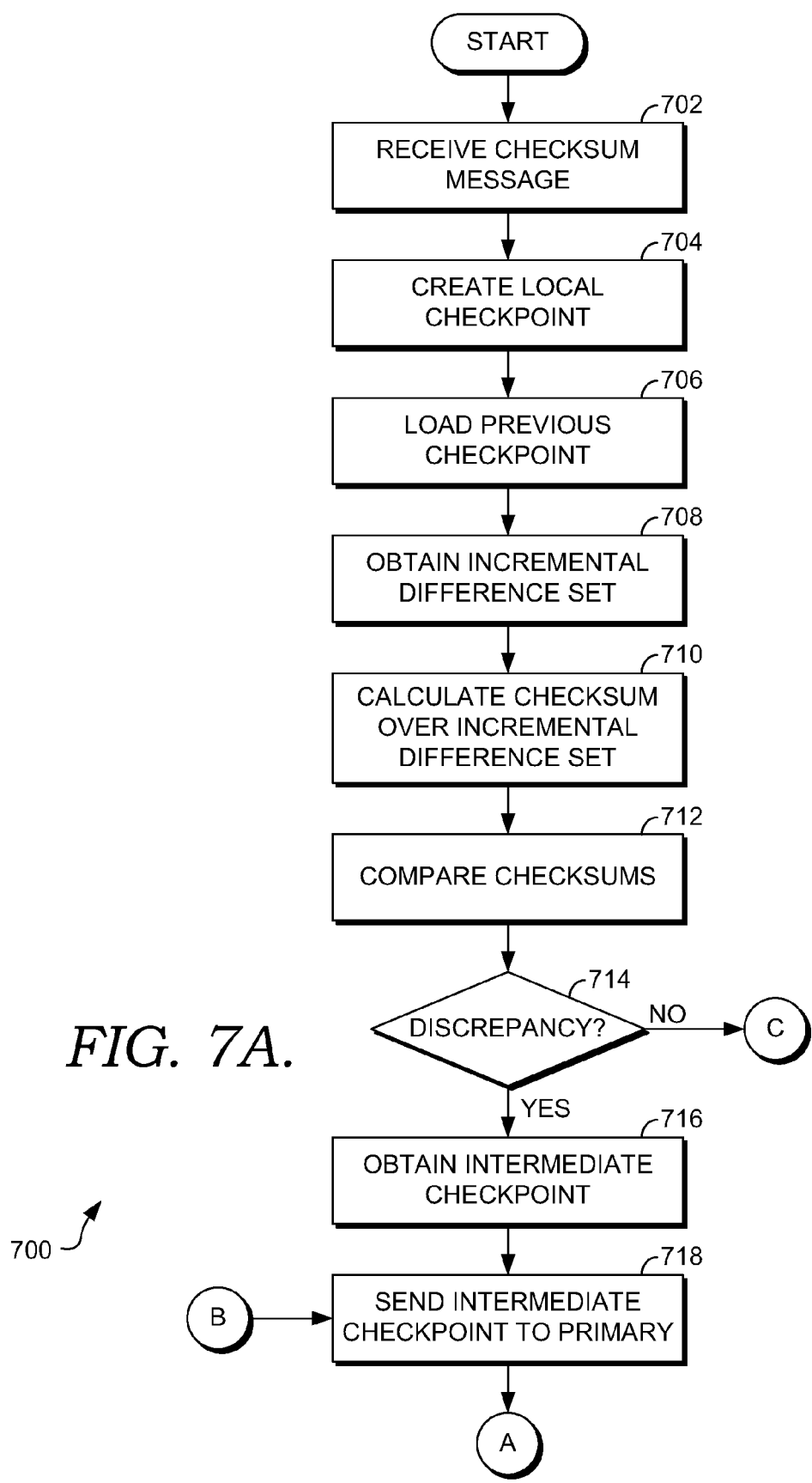
FIGS. 7A and 7B provide a flowchart diagram in accordance with an alternate embodiment of the present invention.
Figure 7B:
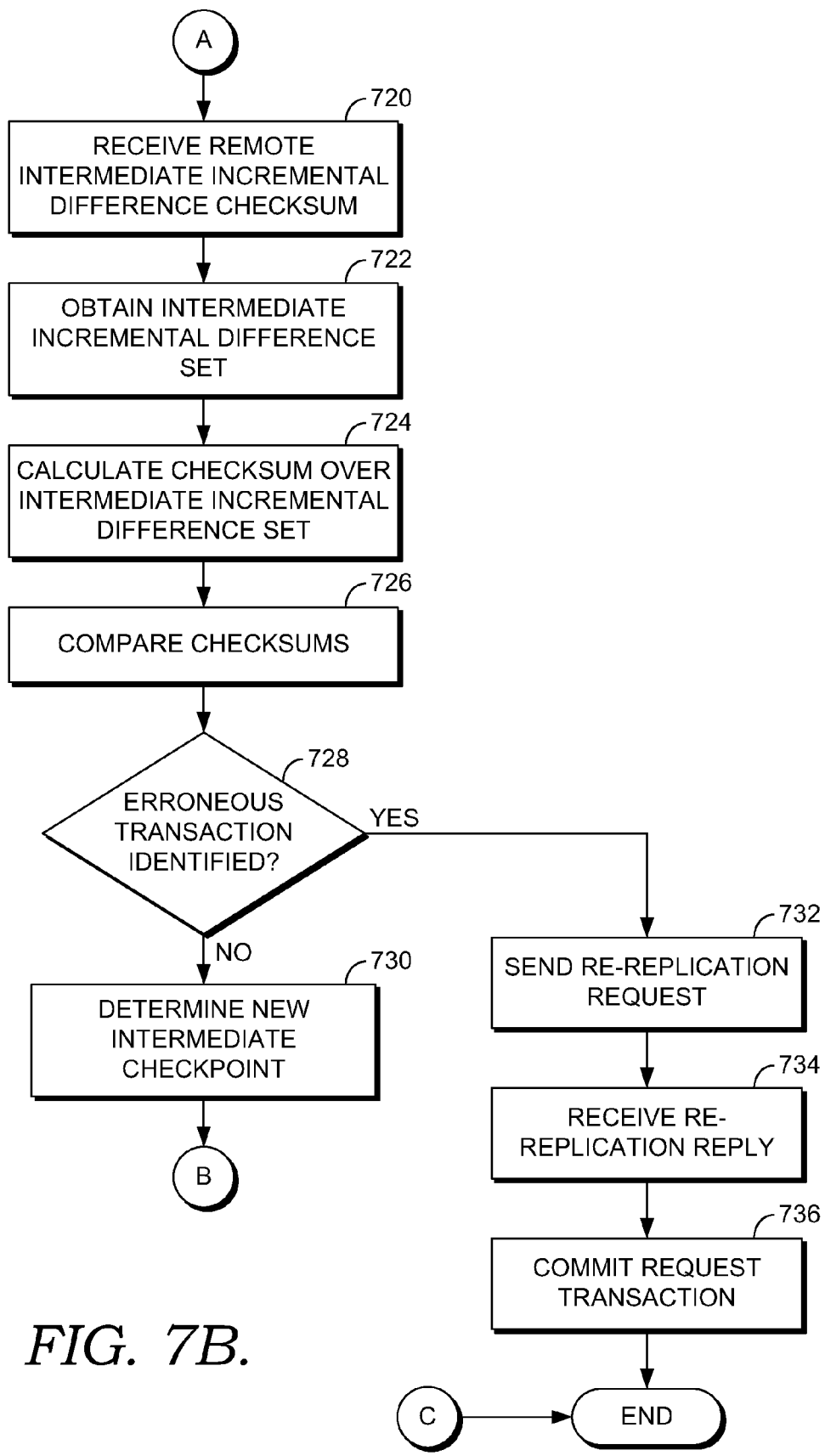

Turning now to FIGS. 7A and 7B, a flowchart diagram in accordance with an alternate embodiment of the present invention is presented and referred to generally by the numeral 700. In this embodiment, data are verified incrementally rather than by range. Initially, at a step 702, a checksum message is received from a primary data store. In this embodiment, the checksum message contains a previous checkpointing information, current checkpointing information, and checksum information. In one version of this embodiment, the previous checkpointing information is an identifier for a previously created checkpoint. In another version, it is information sufficient to create a checkpoint similar to the current checkpointing information, but resulting in a checkpoint that precedes the checkpoint created by the current checkpointing information. In one embodiment, the previous checkpointing information corresponds to a previous state of the system at which the data were known to be correct.

At step a 704, the secondary data store creates a checkpoint in accordance with the current checkpointing information. At a step 706, the secondary data store loads a previously created checkpoint corresponding to the previous checkpointing information. In another embodiment, the secondary data store instead creates the previous checkpoint, based on the previous checkpointing information. At a step 708, the secondary data store obtains an incremental difference set. This incremental difference set represents a set of transactions sufficient to change the state of the data store from its state at the previous checkpoint to its state at the current checkpoint. In one embodiment, this set of transactions is the minimal set of transactions necessary to do so. Thus, if an entry is changed by two transactions, only the second transaction may be needed to replicate the effect of both. In another embodiment, this incremental difference set is calculated in a deterministic fashion known to the primary data center. In yet another embodiment, the incremental difference set may already be present as a result of the way transactions or data are stored, and needs only to be retrieved.

At a step 710, a local incremental checksum is calculated over the incremental difference set; this checksum is compared to the received checksum at a step 712. If no discrepancy is determined at a step 714, it is likely that the data are consistent, and the algorithm terminates in this embodiment. If a discrepancy is detected, further steps are taken to determine the transaction that resulted in the discrepancy.

At a step 716, intermediate checksumming information is determined and used to obtain an intermediate checkpoint. Again, this checkpoint may be created or already present as a result of the way data or transactions are stored. The intermediate checkpoint represents the state of the system at a point between that of the previous checkpoint and the current checkpoint. For additional discussion of calculating incremental checkpointing information, see FIG. 8 and the accompanying discussion. At a step 718, the intermediate checksumming information is sent to the primary data store, and at a step 720, a reply is received, comprising a checksum calculated over an intermediate incremental difference set. In some embodiments, sending checksumming information from the secondary data store to the primary data store may be unnecessary, as the primary data store can determine the information implicitly. In one embodiment, the intermediate incremental difference set is a set of transactions sufficient to change the state of the data store from that of the previous checkpoint to that of the intermediate checkpoint. In another embodiment, the difference set is a set of transactions sufficient to change the state of the data store from that of the intermediate checkpoint to that of the current checkpoint.

At a step 722, an incremental intermediate difference set is determined at the secondary data store similarly to how it was calculated at the primary data store, and a checksum is calculated over the resulting incremental intermediate difference set at a step 724. At a step 726, the calculated checksum and the received checksum are compared, and a determination is made as to whether the transaction that resulted in the error occurred before or after the intermediate checkpoint. At a step 728, it is determined whether the transaction resulting in the error has been identified. If multiple candidates still exist, a new intermediate checkpoint is determined at a step 730, and steps 718 through 728 are repeated until the transaction resulting in the error has been identified. Once step 728 determines that this is the case, the repair process begins. As described above, certain embodiments will store transactions or data in a form that allows them to be used directly as checkpoints; in this case, "determining" is simply retrieval.

At a step 732, a re-replication request is sent to the primary data center. This request comprises a request for the erroneous transaction or range of data. In one embodiment, it also comprises a request for one or more transactions or data ranges that depend on the erroneous transaction or data range. In another embodiment, it also comprises a request for all transactions subsequent to the erroneous transaction.

At a step 734, a re-replication reply is received in response to the re-replication request. This reply contains at least a portion of the requested transactions. In one embodiment, it may also contain additional, unrequested transactions, either related to the erroneous transaction or otherwise. At a step 736, a set of transactions are committed to the local (i.e. secondary) data store. This set contains at least the corrected version of the erroneous transaction, and may also contain other requested transaction and transactions that depend on the erroneous transaction but which were not requested because they were stored locally. Subsequent to the step 736, the state of the secondary data store should be substantially similar to the state of the primary data store and the algorithm terminates. In some embodiments, the incremental difference set between the previous checkpoint and the current checkpoint is recalculated, a checksum re-computed, and compared to the originally received checksum before the algorithm terminates.

Figure 8:
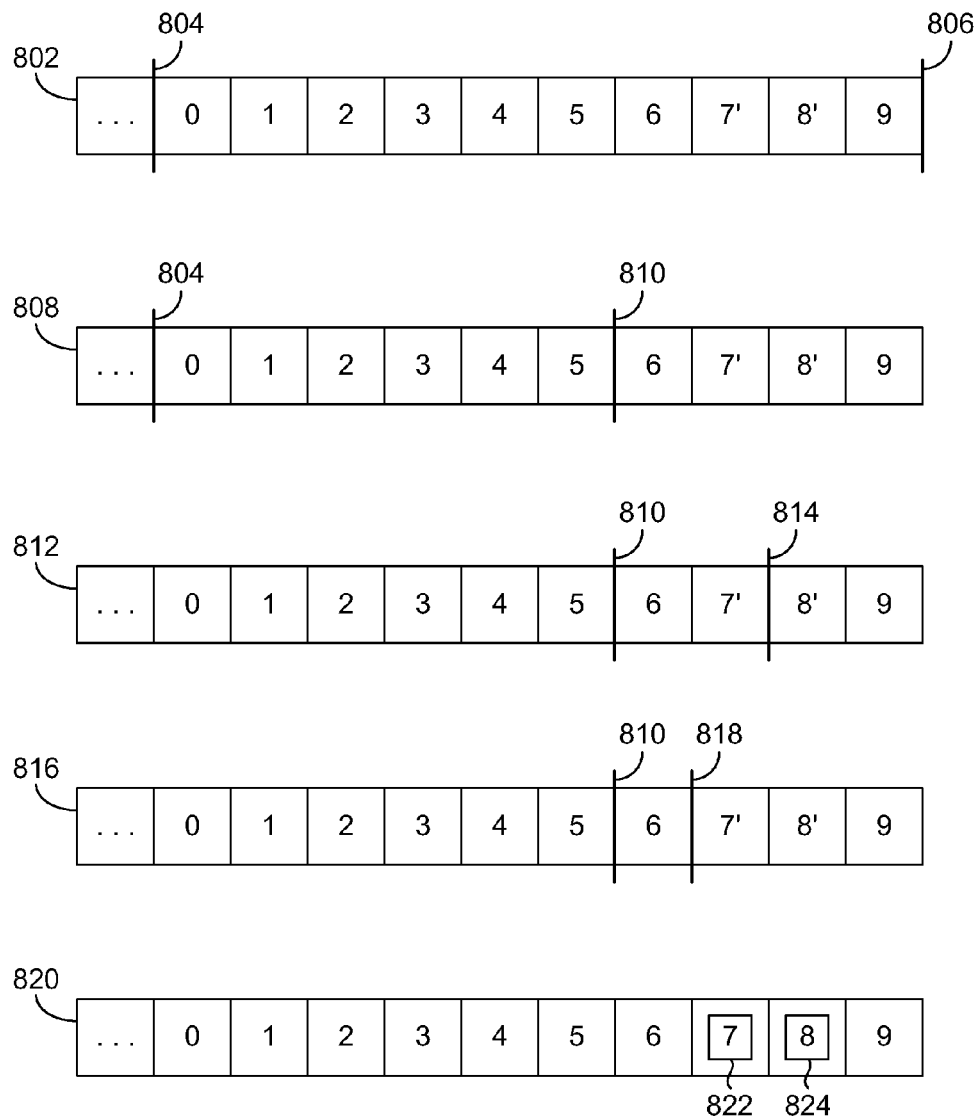
FIG. 8 provides an illustrative example of how intermediate checkpoints are chosen for incrementally validating embodiments of the present invention.

Turning finally to FIG. 8, an illustrative example of how intermediate checkpoints are chosen for incrementally validating embodiments of the present invention is provided in accordance with one embodiment of the present invention. Transaction log 802 represents a series of all transactions, sequentially ordered, that have recently changed the state of the data store. The transaction indicated by sequence number 7 is erroneous (indicated by sequence number 7'), and the transaction indicated by sequence number 8 was received and committed correctly, but depends on the erroneous transaction (indicated by sequence number 8'). Initially, the previous checkpoint 804 (as described in the discussion accompanying FIGS. 7A and 7B) is determined to be after the transaction with sequence number 0 and before the transaction with sequence number 1. The current checkpoint 806 is determined to be after the last transaction received. The incremental difference set in this example could be all of the transactions with sequence numbers between 1 and 9, some subset thereof, or could contain a synthetic transaction combining the results of two or more transactions that appear in transaction log 802.

When it is determined that a discrepancy exists, as in step 714 of FIG. 7A, an intermediate checkpoint is selected. In this case, the intermediate checkpoint selected is an intermediate checkpoint 810, which represents a point after which roughly half of the candidate transactions have occurred. In other embodiments, the intermediate checkpoint 810 might be selected such that approximately half of the total affected data values have been affected. Other methods of selecting an intermediate checkpoint are contemplated. For a transaction log 808, in one embodiment, the intermediate incremental difference set represents the cumulative effect of transactions with sequence numbers 1 through 5. In another embodiment, it represents the cumulative effect of transactions 6, 7', 8' and 9. Based on the checksum for this intermediate incremental difference set, it is determined (such as by step 730 of FIG. 7) that the erroneous transaction lies after the intermediate checkpoint. For a transaction log 812, intermediate checkpoint 810 becomes the previous checkpoint 810, and a new intermediate checkpoint 814 is created between the transactions indicated by 7' and 8'. This time, at a transaction log 816, it is determined that the (first) erroneous transaction occurred before intermediate checkpoint 814, so another new intermediate checkpoint 818 is created between the transactions indicated by 6 and 7', and is it determined that the (first) erroneous transaction occurred after the transaction indicated by 6. Hence, the erroneous transaction has been indicated to be the transaction indicated by 7'. In one embodiment, the transaction indicated by transaction 7' is replaced by a corrected transaction 7, and transaction 8' is replayed, to become corrected transaction 8. In another embodiment (shown in a transaction log 820) both the transaction indicated by sequence number 7 and the transaction indicated by sequence number 8 are requested from the server and replayed. In yet another embodiment, all transactions including and after the erroneous transactions are requested form the server and replayed. Still another embodiment simply re-replicates all data relating to the objects for which the erroneous keys store part or all of the data.

As discussed above, with reference to FIG. 4, certain embodiments may not require that the precise transaction resulting in the discrepancy be identified. One embodiment might require the precise transaction be identified, but another transaction might only require that a checkpoint be located that does not contain the discrepancy and that has an incremental difference set of less than a particular size from the current checkpoint. Each embodiment will contain a predetermined criterion for when the narrowing process can stop; examples of such criteria given above are only exemplary and more will be immediately obvious to one skilled in the art.

Alternative embodiments and implementations of the present invention will become apparent to those skilled in the art to which it pertains upon review of the specification, including the drawing figures. Accordingly, the scope of the present invention is defined by the claims that appear in the "claims" section of this document, rather than the foregoing description.

The invention claimed is:

1. One or more computer storage memories having computer-executable instructions embodied thereon that, when executed, cause a computing device to perform a method of ensuring consistency across a replicated data storage system, the method comprising:

receiving, at a secondary data store, a message from a primary data store, said message comprising an identifier for a previous checkpoint, current checkpointing information, and an incremental difference checksum;

creating a current local checkpoint in accordance with the current checkpointing information;

using said previous checkpoint identifier to load a previous local checkpoint;

obtaining an incremental difference set between said previous local checkpoint and said current local checkpoint;

calculating a local incremental difference checksum over said incremental difference set;

comparing said local incremental difference checksum to the received incremental difference checksum to determine if a discrepancy has been introduced between data stored at the primary data store and data stored at the secondary data store; and determining that said discrepancy exists based on said comparison by:

calculating intermediate checkpointing information, said intermediate checkpointing information useable to create a local intermediate checkpoint, said local intermediate checkpoint representing a state of the secondary data store chronologically between said previous local checkpoint and said current local checkpoint;

sending the intermediate checkpointing information to said primary data store;

receiving, from said primary data store, a second incremental difference checksum;

creating said local intermediate checkpoint using said intermediate checkpointing information;

calculating a second local incremental difference checksum corresponding to said second received incremental difference checksum;

comparing said second local incremental difference checksum to said second received incremental difference checksum to determine whether said discrepancy was introduced before said intermediate checkpoint; and repeating the steps of calculating intermediate checkpointing information, sending, receiving, creating, calculating, and comparing to further narrow a range of time during which said discrepancy was introduced until said range satisfies a predetermined criterion.

2. The one or more computer storage memories of claim 1, wherein the method further comprises the steps of:

sending a request to said primary data store for a retransmission of at least one transaction occurring within said range;

receiving, at the secondary data store, said at least one transaction; and replaying said at least one transaction.

3. The one or more computer storage memories of claim 2, wherein the method further comprises the step of:

replaying at least one transaction occurring after said range.

4. The one or more computer storage memories of claim 2, wherein the method further comprises the step of:

replaying every transaction which occurred after said range.

5. The one or more computer storage memories of claim 1, wherein the second incremental difference checksum corresponds to a second incremental difference set, and wherein the second incremental difference set represents a set of transactions sufficient to update the primary data store from a state corresponding to the previous checkpoint to a state corresponding to a checkpoint created by said intermediate checkpointing information.

6. A method of ensuring consistency across a replicated data storage system performed by one or more processors, the method comprising:
receiving, at a secondary data store, a message from a primary data store, said message comprising an identifier for a previous checkpoint, current checkpointing information, and an incremental difference checksum;
creating a current local checkpoint in accordance with the current checkpointing information;
using said previous checkpoint identifier to load a previous local checkpoint;
obtaining an incremental difference set between said previous local checkpoint and said current local checkpoint;
calculating a local incremental difference checksum over said incremental difference set;
comparing said local incremental difference checksum to the received incremental difference checksum to determine if a discrepancy has been introduced between data stored at the primary data store and data stored at the secondary data store; and
determining that said discrepancy exists based on said comparison by:
calculating intermediate checkpointing information, said intermediate checkpointing information useable to create a local intermediate checkpoint, said local intermediate checkpoint representing a state of the secondary data store chronologically between said previous local checkpoint and said current local checkpoint;
sending the intermediate checkpointing information to said primary data store;
receiving, from said primary data store, a second incremental difference checksum;
creating said local intermediate checkpoint using said intermediate checkpointing information;
calculating a second local incremental difference checksum corresponding to said second received incremental difference checksum;
comparing said second local incremental difference checksum to said second received incremental difference checksum to determine whether said discrepancy was introduced before said intermediate checkpoint; and
repeating the steps of calculating intermediate checkpointing information, sending, receiving, creating, calculating, and comparing to further narrow a range of time during which said discrepancy was introduced until said range satisfies a predetermined criterion.

7. The method of claim 6, wherein the method further comprises:
sending a request to said primary data store for a retransmission of at least one transaction occurring within said range;
receiving, at the secondary data store, said at least one transaction; and
replaying said at least one transaction.

8. The method of claim 7, wherein the method further comprises:
replaying at least one transaction occurring after said range.

9. The method of claim 7, wherein the method further comprises:
replaying every transaction which occurred after said range.

10. The method of claim 6, wherein the second incremental difference checksum corresponds to a second incremental difference set, and wherein the second incremental difference set represents a set of transactions sufficient to update the primary data store from a state corresponding to the previous checkpoint to a state corresponding to a checkpoint created by said intermediate checkpointing information.

11. A system comprising:
one or more processors; and
one or more computer storage media storing computer-useable instructions that, when used by the one or more processors, cause the one or more processors to:
receive, at a secondary data store, a message from a primary data store, said message comprising an identifier for a previous checkpoint, current checkpointing information, and an incremental difference checksum;
create a current local checkpoint in accordance with the current checkpointing information;
use said previous checkpoint identifier to load a previous local checkpoint;
obtain an incremental difference set between said previous local checkpoint and said current local checkpoint;
calculate a local incremental difference checksum over said incremental difference set;
compare said local incremental difference checksum to the received incremental difference checksum to determine if a discrepancy has been introduced between data stored at the primary data store and data stored at the secondary data store; and
determine that said discrepancy exists based on said comparison by:
calculating intermediate checkpointing information, said intermediate checkpointing information useable to create a local intermediate checkpoint, said local intermediate checkpoint representing a state of the secondary data store chronologically between said previous local checkpoint and said current local checkpoint;
sending the intermediate checkpointing information to said primary data store;
receiving, from said primary data store, a second incremental difference checksum;
creating said local intermediate checkpoint using said intermediate checkpointing information;
calculating a second local incremental difference checksum corresponding to said second received incremental difference checksum;
comparing said second local incremental difference checksum to said second received incremental difference checksum to determine whether said discrepancy was introduced before said intermediate checkpoint; and
repeating the steps of calculating intermediate checkpointing information, sending, receiving, creating, calculating, and comparing to further narrow a range of time during which said discrepancy was introduced until said range satisfies a predetermined criterion.

12. The system of claim 11, wherein the computer-usable instructions further cause the one or more processors to:
send a request to said primary data store for a retransmission of at least one transaction occurring within said range;
receive, at the secondary data store, said at least one transaction; and
replay said at least one transaction.

13. The system of claim 12, wherein the computer-usable instructions further cause the one or more processors to:
    replay at least one transaction occurring after said range.

14. The system of claim 12, wherein the computer-usable instructions further cause the one or more processors to:
    replay every transaction which occurred after said range.

15. The system of claim 11, wherein the second incremental difference checksum corresponds to a second incremental difference set, and wherein the second incremental difference set represents a set of transactions sufficient to update the primary data store from a state corresponding to the previous checkpoint to a state corresponding to a checkpoint created by said intermediate checkpointing information.

* * * * *